United States Patent [19]

Sawyer

[11] 3,837,826

[45] Sept. 24, 1974

[54] COLOR SORTING OF IRRADIATED QUARTZ MATERIALS

[75] Inventor: Baldwin Sawyer, Gates Mills, Ohio

[73] Assignee: Sawyer Research Products, Eastlake, Ohio

[22] Filed: Nov. 6, 1972

[21] Appl. No.: 303,857

[52] U.S. Cl............................. 65/30, 65/17, 65/62
[51] Int. Cl............................................ C03c 21/00
[58] Field of Search............................ 65/17, 30, 62

[56] References Cited
OTHER PUBLICATIONS

"The System of Mineralogy" by J. D. Dana & E. S. Dana, 7th Edition, Volume III, "Silica Minerals", pgs. 137, 138 copyright 1944, 1951 & 1962, John Wiley & Sons, Inc.

Principles of Mineral Dressing by A. M. Gaudin, 1939, pages 461–463.

*Primary Examiner*—Arthur D. Kellogg
*Attorney, Agent, or Firm*—Donnelly, Maky, Renner & Otto

[57] ABSTRACT

Methods of isolating quartz, glass or silicate materials having selected aluminum contents are described. The non-destructive method comprises subjecting the materials to ionizing irradiation for a period of time and at an intensity (preferably uniform) sufficient to develop the several distinctive color centers of the materials containing aluminum ions. According to the ions associated with the aluminum ions, the depth of color of each of the various tints developed corresponds to the amount of aluminum in said crystals. The colored crystals which correspond in tint and depth of color to the aluminum contents outside the desired content can be separated. In this manner, aluminum free quartz, glass or silicate materials can be isolated if present in a mixture, or fractions of such materials can be selected, each containing uniform aluminum content.

10 Claims, No Drawings

COLOR SORTING OF IRRADIATED QUARTZ MATERIALS

BACKGROUND OF THE INVENTION

This invention relates to a process for identifying and isolating quartz, glass or silicate materials having selected aluminum contents.

Aluminum is an important impurity which is found in quartz, galss or silicate materials. In natural quartz, aluminum is one of the major impurities, the others being iron, titanium, sodium, lithium and hydrogen. The impurities in, for example, natural quartz, affect products made front it, both in cultured quartz growing and in the manufacturing of fused quartz, where high-purity products are desired. It has been possible to segregate many of the impurities other than aluminum by physically eliminating from the lump all foreign materials adhering to the lump surfaces or included within the lumps. Most iron and titanium are effectively removed by this method. The main surface-absorbed impurities, sodium, lithium and metallic iron (but not their dissolved fractions) may then be removed by an acid wash. In the fused quartz industry, acids such as hydrochloric and hydrofluoric acid are commonly used for such an acid wash.

Aluminum, however, has been particularly difficult to remove as an impurity in quartz because it is usually dissolved in the quartz and pure lumps cannot (until now) be separated from impure lumps by any known, non-destructive, practical technique.

The presence of aluminum in raw natural quartz has been a problem in cultured quartz growing processes because the aluminum dissolves in the hydrothermal fluid and affects several properties of the crystals grown from that fluid. The presence of aluminum in the fluid affects the following crystal properties as indicated: Q is decreased (see IEEE Trans. on Sonics and Ultrasonics, Vol. Su-19, No. 1, Jan. 1972, pages 41–44); the relative sizes of chamfer or S faces are increased; X/Z growth ratio is increased; and the tendency toward creating crevicing flaws is increased. While lithium doping of the hydrothermal solution can be used to control partially the first two of these undesirable properties, sorting of the raw material to control the aluminum content within acceptable appropriate tolerance limits remains the most desirable control method for these problems.

In the fused quartz industry, the control of the variable aluminum content is equally, or more, important. For example, where the fused quartz crystals are to be applied to optical uses, the fused quartz must be homogeneous. It has been observed that if lumps of quartz having different aluminum contents are fused together, the resulting fused quartz will not have a uniform optical index, and the material cannot be used without a long and costly final anneal.

Another type of impurity which can cause problems in fused quartz applications is the alkali metals. It has been found that alkali-bearing quartz is more prone to devitrification. Therefore, in fused quartz applications where devitrification is a problem, alkali-bearing lumps of quartz should not be utilized.

It has long been known that natural quartz crystals turn smoky under the influence of x-rays or gamma rays, some more and some less. Kats (Thesis, Delft (1961), see also "Hydrogen in Alpha-Quartz," Philips Research Reports, 17:201–279 (June, 1962) appears to be the first to explicity describe the yellow shade that some lumps develop, and to note that these contained more OH than the others. Bambauer (Schweiz, Min. Petr. Mitt., 41:335 (1961) studied the relationships of the saturated colors to impurities and stated that the aluminum ions were compensated by the sum of monovalent impurities, as in $Al = Na + Li + H$.

Lehman studied further the yellow color center called "honey" (Yellow Color Centers in Natural and Synthetic Quartz," Phys. kondens. Materie, 13:297–306 (1971).).

SUMMARY OF THE INVENTION

These and other problems have been overcome by providing a method of sorting and selecting raw quartz, glass, or silicate materials containing from 0 to 1000 PPM of aluminum into fractions having selected aluminum contents. The method comprises subjecting said materials to ionizing radiation for a period of time and at an intensity sufficient to cause the several distinctive colorations due to the aluminum and other impurities present to approach saturation, and sorting the irradiated materials into fractions based on their various tints and depth of color. Preferred examples of irradiation include gamma or x-ray radiation. By this method, fractions of quartz, glass or silicate materials can be obtained bearing selected amounts of aluminum or almost no aluminum at all, and controlled levels of alkali content, if needed.

DESCRIPTION OF THE PREFERRED EMBODIMENTS

The materials to which the methods of this invention may be applied include quartz, glass or silicate materials containing from 0 to 1000 parts per million of aluminum. The invention is particularly applicable to quartz crystals which may be either naturally-occuring quartz crystals or grown crystals. Accordingly, the following discussion will be directed to the use of the invention with quartz crystals, although the discussion may be equally applicable to glass and silicate materials containing low aluminum.

It has now been discovered that when quartz crystals containing some aluminum are subjected to ionizing radiation, the crystals undergo a color change depending mainly on the amount of aluminum present therein, but also on other impurities associated with the aluminum. The particular color generated depends mainly on the monovalent impurities which are associated with the aluminum present in the crystals, such as sodium, lithium and hydrogen. It also depends on the crystallographic growth direction in which the crystal originally grew. In natural quartz this is nearly invariably rhombohedral, which fact tends helpfully to improve the consistency of colorations in natural quartz. It has been discovered that the color obtained will differ depending on whether the aluminum ions are compensated by alkali metal ions, such as sodium or lithium, or compensated by hydrogen. More specifically, it is found that aluminum compensated by alkali metals results in a smoky, gray color base whose broad absorption band centers around 460 m$\mu$ (blue), whereas aluminum compensated by hydrogen results in a yellow tint whose absorption is greatest in the ultraviolet (under 200 m$\mu$). When a mixture of alkali and hydrogen compensates the aluminum, mixed tints of yellow, gray and brown result. Iron hydroxide in the quartz also produces a yellow color without irradiation, known as citrine. To avoid confusion, it is preferable to exclude such citrine before irradiation.

At any given radiation dosage, the intensity of each color obtained is dependent on the relative amount of aluminum present in the crystals. Thus, crystals containing higher amounts of aluminum have a deeper coloration of the same tint, but differing tints appear at different densities for the same aluminum contents, the visible yellow tints being paler than the gray shades for corresponding aluminum contents.

The irradiation method, therefore, provides a technique for sorting and separating quartz crystals into batches having selected aluminum contents or containing almost no aluminum at all. The technique also provides a method for selecting quartz crystals containing aluminum compensated by alkalis from crystals containing aluminum compensated by hydrogen. The yellow, hydrogen-bearing quartz crystals are less prone to undergo devitrification after fusing and may, therefore, be useful particularly for such fusing applications if their aluminum content is controlled to levels uniform in each batch. The gray, on the other hand, show the greatest visible color density per aluminum content coefficient; hence they afford the greatest selectivity to visual sorting by this method.

Examples of ionizing radiation useful in the methods of the invention include gamma rays and x-rays. Gamma radiation is preferred since it is more penetrating and will generate the desired coloration uniformly throughout the crystal being irradiated. Gamma rays from cobalt-60 are generally used since cobalt-60 is today a readily available isotope material, and its rays are highly penetrating and so tend to produce more uniform exposures than x-rays produce.

Irradiation of the crystals at a dosage of from about 0.2 up to about 10 megarads has been found to provide various satisfactory coloration levels. The recommended irradiation dosage will depend on the particular kinds of material being treated, the sort sensitivity desired, and the extent of the impurities therein. It has been found that for the same inpurity level, the greater the dosage, the darker the colors obtained, although the colors begin to saturate around 1.5 megarads. Either very dark or very light coloration can reduce the visual discrimination. In general, an irradiation dosage of about 1.5 to 2.5 or 5 megarads has been found particularly useful when applied under normal conditions to transparent natural quartz crystals.

The materials treated in accordance with this invention should be exposed to the irradiation for a period of time that will depend on the source strength. For example, in a vault that exposes at 50,000 rad per hour, an exposure period of about forty hours will produce an irradiation dosage of about 2.0 megarads, which is preferred for many applications.

The technology of gamma irradiation with the gamma rays produced by cobalt-60 isotope by-product material from nuclear reactors has been well developed for use in sterilizing medical equipment, food, etc. There are several installations in both North America and Europe that perform such radiation treatment on a service basis. Alternately, a large volume user can install his own source inside a shielding vault (for protection of personnel), and perform the irradiation under his own control of dosage and its uniformity.

As mentioned above, the various tints and depths obtained by the uniform irradiation procedures reflect the nature and amounts of impurities in the crystals being treated. Accordingly, the invention provides a non-destructive technique of sorting quartz lumps intended for use as raw materials. The physical colors after irradiation, when appropriately sorted, are very sensitive indicators of impurities, and, in fact, can be more sensitive than normal spectrographic analysis techniques. The irradiation process can be used to select the highest purity lumps of quartz which show a minimum of color after irradiation, and also to segregate or remove those containing excessive levels of undesirable impurities such as aluminum and alkali metals.

A method of the invention has been used for beneficiating raw lascas supply batches for hydrothermal growth in which the object is to obtain a moderate average aluminum content in each batch. Another method can be used in a similar way to beneficiate supplies for melting into fused quartz. The following examples illustrate methods of utilizing this invention.

EXAMPLE 1

A batch of 8800 pounds of Number One Lascas Brazilian quartz is irradiated to a 1.2 megarad dose utilizing gamma rays from a cobalt-60 source. Various tints were formed in the quartz lumps and the lumps were segregated by tint. A visual tint analysis of all the lumps gives the following percentages:

TABLE I (Visual Tint Analysis)

| Color | Amount(%) |
| --- | --- |
| Color free | 0.1 |
| Honey (mostly medium) | 2.0 |
| Smoky | |
| Light | 20 |
| Medium | 40 |
| Dark | 6 |
| Mixed | |
| Light | 16 |
| Medium | 12 |
| Dark | 4 |

EXAMPLE 2

Natural quartz lumps are irradiated as in Example 1. The lumps are sampled and grouped on a depth of color scale and on the relative amounts of smoky-honey color as judged by the eye. The grouped samples then are analyzed by atomic absorption techniques to determine the aluminum, lithium and sodium ion concentration in the various samples. The analysis can be facilitated if each sample is treated with hydrofluoric acid to volatilize all its silica. The small residue can then be dissolved into a relatively concentrated solution for atomic absorption analysis. The results of such analysis indicates that the irradiated samples which are colorless or almost colorless contain very little or no aluminum; the light smoky-gray and light honey-colored crystals contain only small amounts of aluminum; and the dark smoky and dark mixed lumps (honey and smoky) contain larger amounts of aluminum. The analysis with respect to the sodium and lithium contents indicates that the smoky lumps contain more of these ions than the honey colored lumps.

Additional, stronger evidence for a real control of the aluminum content and the advantage of such control is shown by the results of hydrothermal quartz runs grown from lascas batches. A significant number of cultured quartz growth runs are conducted on an experimental basis using supply material that has been irradiated in accordance with the procedure described in Example 1, and sorted to consist of one or more of the tints as shown below in Table II. The crystal batches grown in these runs show variations of the crystal properties from batch to batch which are affected by the aluminum content of the growing solution of each batch.

EXAMPLE 3

All of these runs are conducted in vertical cylindrical autoclaves under essentially standard conditions, as disclosed in U.S. Pat. Nos. 3,101,259 and 3,253,893, and include: internal pressure, 12,000 psi; hydrothermal solution, 0.83 molar $Na_2CO_3$; temperature at center of dissolving chamber, 350° to 360°C; baffle, 14 to 17 percent single hole streamlined; temperature difference (by which growing chamber is cooler than dissolving) schedule; linear increase from initial 5° to 9° (to final 10° to 17°C); total Z dimension growth target 0.8 to 1.7 inches; seeds, Y-bars planted in racks spaced according to size target.

The crystal properties of the crystals obtained for the various tint groups are reported in the following Table II.

TABLE II

Properties of Cultured Quartz Crystals Obtained from Sorted Supply Batches

| Group Type | Total Z Average Growth Rate (mils/day) | S/Z Growth Ratio | Average[1] α 3500 | Indicated[1] 5 MHZ Q (×10$^6$) |
|---|---|---|---|---|
| I. Light Smoky[2] | 20.9 | 0.208 | 0.094 | 1.27 |
| II. Medium Smoky[3] | 20.7 | 0.222 | 0.127 | 0.96 |
| III. Dark Smoky[2] | 21.1 | 0.230 | 0.134 | 0.93 |
| IV. Mixed Smoky and Honey[4] | 22.3 | 0.301 | 0.231 | 0.55 |

[1]Ref.: IEEE Trans. on Sonics and Ultrasonics, Vol. Su-19, No. 1, January 1972, pp. 41–44.
[2]Average of six runs
[3]Average of five runs
[4]Average of four runs The data in Table II show the effect of aluminum on the grown crystal properties. The chamber or S/Z growth ratio and the alpha 3,500 increase as the aluminum content in the hydrothermal solution increases. The rise in the average value for alpha 3,500 indicates a decreasing Q value as shown in the right hand column of Table II. Such changes in these values are in general accordance with the results observed in growing crystal from quartz lumps having selected aluminum contents as determined by this invention. Therefore, the invention offers the advantage of providing a method for non-destructively selecting quartz samples having low or controlled aluminum content for growing crystal having desired characteristics.

EXAMPLE 4

A lascas batch having a very low aluminum content (light to very light smoky) is utilized to grow premium Q grade quartz. The conditions described in Example 3 were followed with the following exceptions: hydrothermal solution: 0.82 molar $Na_2CO_3$, 0.01 molar $Li_2CO_3$; slow growth. For comparison the same procedure is followed on a dark mixed batch having more aluminum. The crystal properties of both runs are shown in Table III.

TABLE III

Properties of Cultured Quartz Crystals Obtained from Sorted Supply Batches

| Group Type | Total Z Average Growth Rate (mils/day) | Average α 3500 | Indicated 5 MH$_Z$ Q (× 10$^6$) |
|---|---|---|---|
| Light to Light smoky* | 11.6 | 0.032 | 2.9 |
| Dark Mixed | 15.1 | 0.068 | 1.7 |

*Average of 5 runs.

The above reported crystal properties also demonstrate the effect of aluminum content of the hydrothermal solution used in growing said crystals. Clearly, the Q value is lower when the aluminum content is higher.

EXAMPLE 5

This example illustrates the effect of aluminum content on the crevicing tendency of the grown quartz. Crevicing is a growth defect in the grown quartz which resembles a void or crack between growth hillocks. Several hundred cases of clear colorless No. Two Brazilian Lascas is sample sorted as follows: A 5 percent sample from each case is irradiated to 2 megarads and sorted into the eight categories listed in Table I. Each case is rated according to percent content of the favorable categories, i.e., low aluminum. The growth runs were standard as in Example 3 except that the hydrothermal solution was 0.80M $Na_2CO_3$ and 0.03 M $Li_2CO_3$. The seeds were Z plates. The properties of the grown crystal are reported in Table IV; Group I supplies contain higher total aluminum than the Group II supplies and produce crystal having a greater degree of crevicing.

100 percent sorting of all lumps may be done by automatic machines which sort discriminating on the basis of color. Such machines are commercially available for quanity sorting of solid bodies such as beans,

TABLE IV

GROWN CRYSTAL PROPERTIES

| Group | Run | % Favorable Sort (Figure of Merit) | Average α 3500 | Indicated Q | % of Crystals Creviced |
|---|---|---|---|---|---|
| I. | A | 44.2 | 0.078 | | 9.2 |
| | B | 10.0 | 0.067 | | 19.3 |
| | C | 20.3 | 0.089 | | 15.6 |
| | Average: | 24.8 | 0.078 | 1.50 | 14.6 |
| II. | A | 87.7 | 0.089 | | 2.5 |
| | B | 68.8 | 0.090 | | 0.3 |
| | C | 63.0 | 0.078 | | 1.2 |
| | Average: | 73.2 | 0.083 | 1.45 | 1.3 | peas, lump minerals, etc. These machines normally view the illuminated body through a filter by means of a lens and electric eye system. For best gray center discrimination, a blue filter at 460 to 466 mμ will serve, although care is needed in trading off density of a filter against intensity of illumination and the speed of viewing response, which affects the practical sort running speed of the machine. This consideration normally operates to prefer a pale blue, broad filter to a deep blue monochromat filter.

The considerations on sorting for the honey center are somewhat different. This color is visible to eyes because of its violet absorption peak at 400 mμ which means that eye sorting is discriminating on the basis of this weak absorption. The discrimination for this color center increases the farther the observed colors are moved into the ultraviolet toward 200 mμ. Lenses of regular optical glass transmit the long ultraviolet range: 320 to 400 mμ. Special quartz lenses are necessary to transmit the middle ultraviolet (280 to 320 mμ), and most of the short wave or "far" ultraviolet, in addition to the long wave ultraviolet and visible. "High pressure" mercury lamps yield good illumination in both blue and ultraviolet wavelengths.

If visual hand sorting is used, the cost of 100 percent sorting as above may be higher than necessary when it is the average impurity content of a batch that is to be controlled. It has been found that most of the cases in which number one or number two lascas is shipped from Brazil contain a relatively uniform mix or lump colors as in Example 1 within each case. Accordingly, a sampling plan is utilized by which a 5 percent sample is taken from each case, irradiated, and sorted into the categories enumerated above. A rough figure of merit is computed by summing the weight percentages of all the lumps classed in the low aluminum categories; color free, light smoky, medium smoky and light mixed. In practice, a general correlation has been found between this figure of merit and low aluminum content. For this reason it is practical to retain control over total batch aluminum content by blending in each batch cases whose sorted figures of merit average at an appropriately selected target.

Sorting for fusing purposes differs in details but not in principle. When the objective is to fuse batches each having uniform aluminum contents, it is necessary to irradiate uniformly and sort a large quantity of clean, clear quartz in order to obtain enough lumps for one batch of each color gradation. The uniformity of aluminum desired in each batch will determine the range of color depth to be allowed in each category. At first it is necessary also to separate by tints on the gray-yellow color scale because of the varied coefficients of aluminum content to color depth of the various tints. In other words, each batch to be fused will consist essentially of lumps having one tint and one depth of that tint. The small range of tint and tint depth to be allowed in that batch will depend on the uniformity required of the batch. Lumps having varied tint or tint depth within one lump will pose a problem; if the variation is severe enough the lump must either be broken into smaller pieces or discarded. Variations in lump size may also pose problems in matching of tint and tint depth. Best results are obtained from sorting lumps whose size range is minimized.

In addition to controlling aluminum content, it is also possible to select for low alkali content by preferring either the light smoky to color-free material (which can be stored well visually), or the pale honey material. The latter can be sorted for aluminum content visually with much lower selectivity than can the smoky material, but it is subject to more sensitive sorting by a machine sort selecting by ultraviolet light.

Probably the main limitation on the capability of this invention when used to sort natural quartz lumps is the natural quartz itself. Since their impurity contents are unchanged by the irradiation treatment, it will not be possible to get output lumps any purer or more uniform than those that are the input to the process. The fact that a great majority of natural quartz was initially grown on rhombohedral faces helps insure a general reproducibility of the relationships between tint, depth of tint, and impurity contents.

When applying the invention either for 100 percent sorting or sample sorting, it is worth selecting for preference those mine sources or deposits that yield a high proportion of their lumps in the sort catagories that are desired. In other words, the invention is just as useful in selecting preferable natural deposits as it is in selecting individual lumps. Even before this invention, evidence of varied general impurity levels in quartz from different mines and different general localities was known in the trade. Mines in the Minas Gerais state of Brazil enjoyed a preference over those in Bahia state as tending to yield a higher purity. Madagascar quartz was known to have its own pecularities, etc.

As a part of the evaluation of this invention, the product lascas from about twenty individual mines in various localities in Brazil was evaluated for its irradiated color sort properties, its impurity content, and its behavior in hydrothermal growth runs. In addition, quartzite from about twelve assorted deposits in North America was similarly evaluated. In general, very wide variations in the test results were found, and about half the localities were dropped from further tests on the basis of their very deep radiation blackening and their high aluminum contents (500 to 1,000 ppm). Accordingly, all of the data in Tables II, III, and Iv should be regarded as based on natural lascas from thoroughly screened sources selected for their low aluminum contents. The invention is much more positive and selective with materials containing more aluminum, and such quartz or quartzite material is by far more common throughout the earth. The problem has been to find a consistent, moderately low level of aluminum rather than medium to high ones. However, these are readily available if needed, and also can be readily selected by the methods of this invention.

If a mine can be found whose output comes close to matching the input required for a batch process, then sampling methods are likely to suffice for control. This has essentially been demonstrated for hydrothermal batch control as in Table IV. However, if the product required is a low fraction of the mine output; e.g., the highest purity fraction running perhaps five to ten percent, then 100 percent sorting will be required, as in the Premium Q runs in Table III, the light to light smoky group.

The high uniformity requirement for fusing quartz batches is more stringent than for hydrothermal growth. The limit on uniformity attainable by sorting material from one mine is set first by the nature of the lumps yielded from that mine, especially by the normal variation experienced within each lump from that mine. For best results, all controllable variables in the process should be controlled. These include the radiation dosage uniformity from lump to lump, the sizes of the lumps being directly compared, and the tint balance of the group being compared for tint density.

As the invention is used under a specific set of control conditions such as at a standardized dosage level for sorting quartz from one mine source, it is to be expected that calibration curves will be developed for controlled variables (such as aluminum content, OH content, or important properties in the final product) in relation to the density of each separate tint. Based on these curves it will be possible to blend matched aluminum contents if desired from different tints whose color densities will not match. However, this is not recommended until good calibrations have been developed. Even then it will imply blending different alkali-OH balances, which may not be desirable for all purposes such as, for example, fusing.

Cultured quartz differs from natural quartz in its irradiation coloring behaviors because a grown bar consists almost entirely if X and Z growth regions, and not of the rhombohedral growth of which natural quartz is mainly composed. The radiation behavior of cultured quartz is typified by the sections reported in FIG. 1 of the publication "Quality in Cultured Quartz," published by Sawyer Research Products, Inc., Eastlake, Ohio, 1965. In these it is seen that the Z growth regions resist darkening almost completely, while the X regions do darken to varying degrees, depending upon the concentration of aluminum in the hydrothermal solution and also on the growth rate. In this case the Z material is not nearly free of aluminum as its lack of color suggests, but rather it contains approximately half the concentration of aluminum that the X region contains.

Accordingly, the methods of this invention can be used to yield useful information about cultured quartz, but the color signs must be interpreted differently from those of natural quartz. In general, the color in a Y section sample from a run is a useful indicator of the general aluminum level in the quartz of that run.

What is claimed is:

1. A method of distinguishing and sorting colorless and smoky quartz, glass or silicate materials containing no aluminum, aluminum compensated by alkali metal ions, and aluminum compensated by hydrogen ions or a combination of alkali metal and hydrogen ions which comprises:
    a. subjecting said materials to ionizing irradiation for a period of time and at an intensity sufficient to cause the several distinctive colorations that occur in the aluminum-containing materials,
    b. separating the substantially clear colorless materials which contain substantially no aluminum,
    c. separating the smoky gray materials which contain aluminum compensated by alkali metal ions,
    d. separating the yellow colored materials containing aluminum compensated by hydrogen ions, and
    e. separating the remaining mixed gray and yellow colored materials.

2. The method of claim 1 wherein either gamma-ray or X-ray irradiation is utilized.

3. The method of claim 1 wherein gamma-ray irradiation is utilized.

4. The method of claim 1 wherein a radiation dosage of from about 0.2 to about 10 megarads is utilized.

5. The method of claim 1 wherein the material is subjected to a 1.5 to 2.5 megarad dosage of cobalt-60 gamma-ray irradiation.

6. A method of distinguishing and sorting colorless and smoky quartz containing substantially no aluminum, aluminum compensated by alkali metal ions, aluminum compensated by hydrogen ions, and aluminum compensated by a mixture of alkali metal and hydrogen ions which comprises:
    a. subjecting said quartz to ionizing irradiation for a period of time and at an intensity sufficient to cause the several distinctive colorations that occur in the aluminum-containing quartz,
    b. separating the substantially clear colorless quartz which contain substantially no aluminum,
    c. separating the smoky gray quartz which contain aluminum compensated by alkali metal ions,
    d. separating the yellow colored quartz containing aluminum compensated by hydrogen ions, and
    e. separating the mixed gray and yellow colored quartz which contain aluminum compensated by alkali metal and hydrogen ions.

7. The method of claim 6 wherein cobalt-60 gamma-ray irradiation is utilized.

8. The method of claim 6 wherein a radiation dosage of from about 1.5 to about 2.5 megarads is utilized.

9. A method of separating aluminum-containing quartz crystals into fractions having substantially uniform aluminum content which comprises:
    a. providing quartz crystals containing some aluminum,
    b. subjecting the crystals to ionizing irradiation for a period of time and at an intensity sufficient to cause the distinctive smoky gray, yellow or mixed colorations of the aluminum-containing quartz crystals,
    c. separating the smoky gray crystals from the mixture and sorting according to the color depth of the crystals,
    d. separating the yellow colored crystals and sorting said yellow colored crystals according to color depth, and
    e. separating the crystals having a mixture of the smoky gray and honey colors and sorting said crystals into various mixed fractions each having substantially uniform color depth of the mixture of gray and yellow.

10. The method of claim 9 wherein the aluminum content of each color sort obtained in steps (c), (d) and (e) is determined by analysis and color sorts having approximately equal aluminum content are combined into fractions having substantially uniform aluminum content.

* * * * *